United States Patent
Ukai et al.

(10) Patent No.: US 10,057,338 B2
(45) Date of Patent: Aug. 21, 2018

(54) DATA DISTRIBUTION APPARATUS, DATA DISTRIBUTION METHOD, AND DATA DISTRIBUTION PROGRAM FOR PARALLEL COMPUTING PROCESSING SYSTEM

(71) Applicant: Hitachi, Ltd., Tokyo (JP)

(72) Inventors: Toshiyuki Ukai, Tokyo (JP); Masaaki Shimizu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 287 days.

(21) Appl. No.: 14/910,420

(22) PCT Filed: Mar. 26, 2014

(86) PCT No.: PCT/JP2014/058445
§ 371 (c)(1),
(2) Date: Feb. 5, 2016

(87) PCT Pub. No.: WO2015/145598
PCT Pub. Date: Oct. 1, 2015

(65) Prior Publication Data
US 2016/0182620 A1   Jun. 23, 2016

(51) Int. Cl.
*G06F 15/16* (2006.01)
*H04L 29/08* (2006.01)
(Continued)

(52) U.S. Cl.
CPC .......... *H04L 67/1004* (2013.01); *G06F 3/067* (2013.01); *G06F 3/0613* (2013.01); *G06F 3/0659* (2013.01); *H04L 67/42* (2013.01)

(58) Field of Classification Search
CPC ..... H04L 67/1004; H04L 67/42; G06F 3/067; G06F 3/0659; G06F 3/0613
See application file for complete search history.

(56) References Cited

U.S. PATENT DOCUMENTS 7,533,141 B2 * 5/2009 Nadgir .................. G06F 9/5072
370/395.1
9,619,297 B2 * 4/2017 Jain ....................... G06F 9/5088
(Continued)

FOREIGN PATENT DOCUMENTS

JP   2010-231636 A   10/2010
JP   2012-133629 A   7/2012
JP   2013-196206 A   9/2013

OTHER PUBLICATIONS

International Search Report issued in PCT/JP2014/058445 dated Jul. 22, 2014.

*Primary Examiner* — Krisna Lim
(74) *Attorney, Agent, or Firm* — Foley & Lardner LLP

(57) ABSTRACT

A problem is to distribute data efficiently to each computing node in a parallel computing processing system.
A parallel computing processing apparatus 1 accomplishes high-speed computing processing by processing the data read out from a plurality of storage apparatuses 106 via an I/O management server 102A and an I/O server 102B in parallel by a plurality of computing servers 101. During the above, when a job is submitted from a user terminal 103, the I/O management server 102A determines, with respect to a program to be executed, which of the computing servers 101 executes each of the processes of the program and whether each of the processes uses a computing acceleration module 105 with referring to a host definition information table 151, a rank arrangement information table 152, an acceleration module location information table 153, and an application characteristics information table 154. If the I/O management server 102A determines that each of the processes uses the computing acceleration module 105 and the process concerned is processed by the computing server 101 having the (Continued)

computing acceleration module 105, the I/O management server 102A allots an I/O bandwidth for the process concerned preferentially.

6 Claims, 14 Drawing Sheets

(51) Int. Cl.
*H04L 29/06* (2006.01)
*G06F 3/06* (2006.01)

(56) References Cited

U.S. PATENT DOCUMENTS

| 2010/0014528 A1* | 1/2010 | Amir .................. H04L 45/04 370/400 |
| 2013/0246679 A1 | 9/2013 | Miyoshi |
| 2015/0019689 A1* | 1/2015 | Singh .................. H04L 67/06 709/219 |

* cited by examiner

HOST DEFINITION INFORMATION TABLE 151

| COMPUTING SERVER NAME | QUANTITY OF CPU |
|---|---|
| HOST 1 | 4 |
| HOST 2 | 8 |
| HOST 3 | 4 |
| : | : |

FIG. 3

RANK ARRANGEMENT INFORMATION TABLE 152

| RANK NUMBER | COMPUTING SERVER NAME |
|---|---|
| 1 | HOST 1 |
| 2 | HOST 2 |
| 3 | HOST 3 |
| 4 | HOST 4 |
| : | : |

FIG. 4

ACCELERATION MODULE LOCATION INFORMATION TABLE 153

| COMPUTING SERVER NAME | PRESENCE OR ABSENCE OF COMPUTING ACCELERATION MODULE |
|---|---|
| HOST 1 | PRESENT |
| HOST 2 | ABSENCE |
| HOST 3 | PRESENT |
| : | : |

FIG. 5

APPLICATION PROGRAM CHARACTERISTICS INFORMATION TABLE 154

| PROGRAM NAME | USE OF COMPUTING ACCELERATION MODULE | DATA PRECISION |
|---|---|---|
| AP1 | NO | DOUBLE-PRECISION |
| AP2 | YES | SINGLE-PRECISION |
| AP3 | NO | DOUBLE-PRECISION |
| ⋮ | ⋮ | ⋮ |

FIG. 6

RUNNING PROGRAM INFORMATION TABLE 155

| COMPUTING SERVER NAME | PROGRAM NAME | NUMBER OF PROCESS | USE OF COMPUTING ACCELERATION MODULE | I/O PRIORITY |
|---|---|---|---|---|
| HOST 1 | AP2 | 2 | YES | HIGH |
| HOST 2 | AP1 | 8 | NO | LOW |
| HOST 3 | AP2 | 3 | YES | HIGH |
| ⋮ | ⋮ | ⋮ | ⋮ | ⋮ |

FIG. 7

I/O VOLUME HINT INFORMATION TABLE 156

| PROGRAM NAME | PROGRAM TYPE | PROBLEM SIZE | COMPUTING PERFORMANCE PER UNIT PROCESSING [FLOPS] |
|---|---|---|---|
| AP1 | NORMAL | SMALL | 10M |
| | | MIDDLE | 15M |
| | | LARGE | 20M |
| AP2 | COMPUTING ACCELERATION MODULE | SMALL | 30M |
| | | MIDDLE | 40M |
| | | LARGE | 50M |
| ⋮ | ⋮ | ⋮ | ⋮ |

FIG. 10

JOB CONTROL SCRIPT (jcs.sh)

```
#JCS -unit SERVER=50:ACC=4
#JCS -psize Middle
  :
mpiexec -n 200 AP2 input.dat ./output
  :
```

JOB CONTROL SCRIPT (jcs.sh)

```
> jcssubmit jcs.sh
```

COMPUTING SERVER REQUIRED
I/O PERFORMANCE INFORMATION TABLE 157

| COMPUTING SERVER NAME (1301) | REQUIRED I/O PERFORMANCE [Byte/s] (1302) |
|---|---|
| HOST1 | 320M |
| HOST2 | 240M |
| HOST3 | 480M |
| : | : |

FIG. 13

REQUIRED I/O PERFORMANCE/
PRIORITY DEFINITION TABLE 158

| REQUIRED I/O PERFORMANCE (1401) | I/O PRIORITY (1402) |
|---|---|
| LESS THAN 200MB/s | LOW |
| LARGER THAN OR EQUAL TO 200MB/s LESS THAN 400MB/s | MIDDLE |
| LARGER THAN OR EQUAL TO 400MB/s | HIGH |

FIG. 14

JOB CONTROL SCRIPT 1571

```
#JCS -unit SERVER=50:ACC=4
#JCS -psize Middle
         :
#JCS -stagein      AP1              ./
#JCS -stagein      ./input.dat      %opt:./

#JCS -stageout     %opt:./output/*  ./result/
         :
mpiexec -n 1000 AP1 input.dat ./output
         :
```

FIG. 16

STAGING DATA ALLOCATION INFORMATION TABLE 1551

| REQUIRED THROUGHPUT [Byte/s] | STRIPE SIZE OF FILE SYSTEM |
|---|---|
| 0-400M | 1 |
| 400M-800M | 2 |
| 800M-1600M | 4 |
| 1600M-3200M | 8 |
| : | : |

FIG. 18

DATA DISTRIBUTION APPARATUS, DATA DISTRIBUTION METHOD, AND DATA DISTRIBUTION PROGRAM FOR PARALLEL COMPUTING PROCESSING SYSTEM

TECHNICAL FIELD

The present invention relate s to a data distribution apparatus, a data distribution method, and a data distribution program for a parallel computing processing system.

BACKGROUND ART

A super computer which is required to carry out a complicated scientific technical calculation at high speed employs a configuration of a parallel computing processing system including a number of calculating nodes coupled with a storage for containing data to be used for computing via a high-speed communication network as well as providing each processor executing computing processing with higher performance. In the above parallel computing processing system, hereinafter referred to as a parallel system, in order to improve processing efficiency of the entire system, efficient distribution of data stored in the storage to the number of calculating nodes as necessary is required.

In recent years, in consideration of mounting difficulty in enhancing performance of a processor itself due to package density or the like, in enlarging a scale of the parallel system due to restriction for power consumption, installation area or the like, etc., a so-called heterogeneous configuration is proposed in which processors of different types are used according to the processing details of the program designated by the job submitted to the system in order to improve processing efficiency of the parallel system. In the heterogeneous configuration, an ordinary processor for executing a general computing processing, a GPGPU (General-Purpose computing on Graphics Processing Units) for sending a special computing processing in the program to a GPU (Graphics Processing Unit) dedicated to a graphics processing usually, and the like are employed. With adoption of the heterogeneous configuration, improving a speed of computing processing at each calculating node of the parallel system is expected, however, the aforementioned efficient distribution of data still remains important.

In this respect, conventionally, the technique disclosed in Patent Literatures 1-3 for example are proposed. Patent Literature 1 discloses in the abstract, for the purpose of providing a hierarchical storage system of both high performance and lower power consumption, a storage system 2 coupled with a computer management server 18, including a first hierarchical storage apparatus 11 providing a first volume 51 for storing files, a second hierarchical storage apparatus 12 providing a second volume 52 for storing files, and a storage management server 19, the server 18 having information of jobs executed on the computer 14 sequentially and information of job queues under execution or waiting for being executed, the server 19 collecting/analyzing the above information and specifying the volume 52 which the job accesses, calculating mean waiting time before starting execution of each job from the job queue information, and working a disk apparatus constructing the volume 52, and calculating threshold time required for copying the volume 52 to volume 51, when the mean waiting time is shorter than the threshold time at the time of job submission, the execution of the job being delayed by the threshold time. Patent Literature 2 discloses in the abstract, for the purpose of facilitating performance guarantee of minimum guarantee type on resource consumption of a storage device of each tenant, and predicting resource consumption required based on the input/output characteristics of an application, a storage resource control system 100 for controlling resource availability of a storage 211 by controlling bandwidth consumption of a network 212 by a bandwidth controller 221 comprising a resource predicting part 120 for predicting resource consumption of the storage 211 as required from a linear model 112 consisting of an input/output processing volume model and a bandwidth consumption model and the I/O characteristics 121 based on the input/output processing volume model and for predicting the bandwidth consumption of the corresponding network 212 based on the bandwidth consumption model, and a bandwidth determining part 130 for determining bandwidth control information 132 from predicted bandwidth consumption 122 based on a setting policy 131. Patent Literature 3 discloses, in claim 1, an accelerator management apparatus comprising a first storage storing an accelerator identifier for identifying an accelerator used by an application correlated with an application identifier for identifying an application, a second storage storing an accelerator identifier of the accelerator installed in a slot correlated with each slot identifier for identifying each of the slots of an extension box containing the multiple accelerators, a first identifying part 26 identifying an accelerator identifier corresponding to the application from among the first storage when a request for executing an application is received from a host, a second identifying part identifying a slot identifier corresponding to the accelerator identifier identified by the first identifying part from among the second storage, and an allotting control part allotting to the host a slot identified by the slot identifier identified by the second identifying part.

CITATION LIST

Patent Literature

[PTL1] JP2010-231636A
[PTL2] JP2012-133629A
[PTL3] JP2013-196206A

SUMMARY OF INVENTION

Technical Problem

The above patent literatures relate to controlling operation of a storage according to an execution status of a job, controlling a bandwidth in a storage network according to I/O characteristics of an application, flexible exchanging of an accelerator used by a host according to an application, and so on. However, any of the patent literatures does not disclose improvement of efficiency of data distribution to each computing node from a storage in a parallel system employing the aforementioned heterogeneous configuration to a computing node.

Taking the above problem into consideration, an object of the present invention is to provide a data distribution apparatus, a data distribution method, and a data distribution program for a parallel computing processing system that enables efficient distribution of data from a storage to a number of computing nodes in the parallel system according to a program to be executed.

An aspect of the present invention for solving the above and other objects is a data distribution apparatus in a parallel computing processing system executing parallel processing of an application by a plurality of computing nodes, each node being configured as a computing server comprising a processor and a memory, the data distribution apparatus configured to distribute data to be used by the application to the respective computing nodes, in the parallel computing processing system, a part of the computing servers being provided with a computing acceleration module carrying out a higher-speed computing processing according to designation by the application concerned when a specific one of the applications is executed, data to be used by the application being stored in a plurality of storage apparatuses in a distributed manner, the data distribution apparatus holding computing acceleration module location information indicating which of the computing servers has the computing acceleration module and application characteristics information indicating which of the applications uses the computing acceleration module, the data distribution apparatus receiving a job designating which of the applications to be executed, the data distribution apparatus referring to the computing acceleration module location information and the application characteristics information with respect to the application to be executed designated in the job, determining whether the application uses the computing server with the computing acceleration module, generating input/output processing priority information recording that prioritizing the input/output processing with respect to a data input/output request received from computing server regarding the application, distributing the input/output processing priority information to the respective storage apparatuses, and enabling the respective storage apparatuses to control an input/output bandwidth based on the input/output processing priority information.

Advantageous Effects of Invention

According to the present invention, a data distribution apparatus, a data distribution method, and a data distribution program for a parallel computing processing system that enables efficient distribution of data from a storage to a number of computing nodes in the parallel system according to a program to be executed is provided.

BRIEF DESCRIPTION OF DRAWINGS

FIG. 3 shows a configuration example of a host definition information table 151;

FIG. 4 shows a configuration example of a rank arrangement information table 152;

FIG. 5 shows a configuration example of an acceleration module location information table 153;

FIG. 6 is a configuration example of an application program characteristics information table 154;

FIG. 7 shows a configuration example of a running program information table 155;

FIG. 10 is a configuration example of an I/O volume hint information table 156;

FIG. 11A shows an example of a job control script submitted to the parallel system 1;

FIG. 11B shows an example of a job control script submitted to the parallel system 1;

FIG. 13 is a configuration example of a computing server requiring I/O performance information table 1200;

FIG. 14 is a configuration example of a required I/O performance/priority definition information table 1300;

FIG. 16 shows an example of a job control script submitted to the parallel system 1 shown in FIG. 15;

FIG. 18 is a configuration example of a staging data arrangement information table 1451.

DESCRIPTION OF EMBODIMENTS

Figure 1:
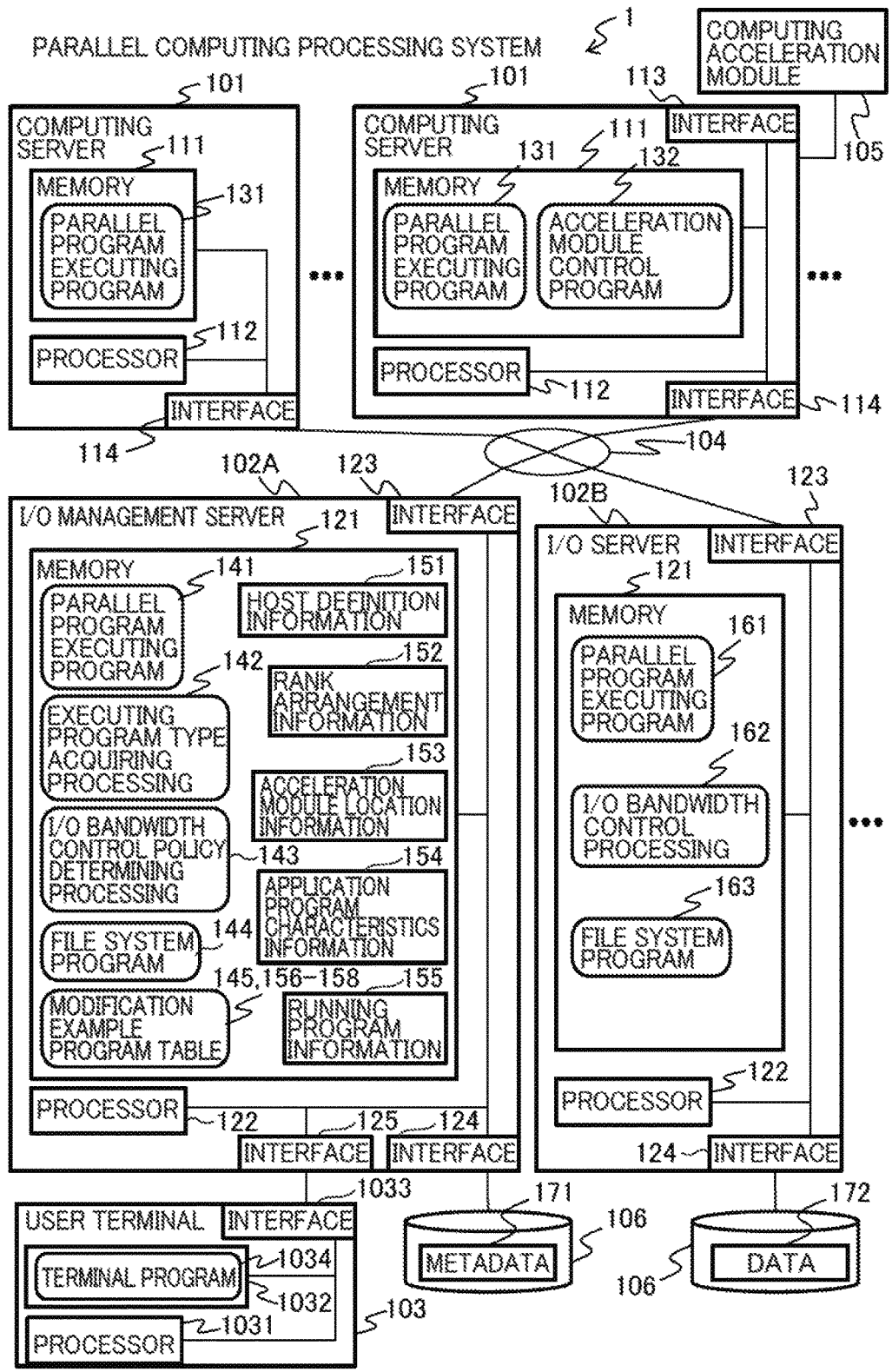
FIG. 1 shows an entire configuration example of a parallel system 1 to which a data distribution apparatus according to an embodiment of the present invention.

The present invention will be described according to an embodiment thereof referring to the drawings, hereinbelow. First, the parallel system 1 employing a data distribution apparatus according to an embodiment of the present invention will be described. FIG. 1 shows an entire configuration example of the parallel system 1. The parallel system 1 comprises a plurality of computing servers 101, an I/O management server 102A as a data distribution apparatus, an I/O server 102B, a user terminal 103, a computing acceleration module 105, and a storage apparatus 106. The respective computing servers 101 and the respective I/O servers 102 are communicatively coupled with a communication network 104. In the parallel system 1, in response to the job submitted by the user terminal 103, each of the computing servers 101 inquires location of data to be used in the job to the I/O management server 102A through the communication network 104 and acquires the data from the I/O server 102B storing the data according to the result of the inquiry.

Each of the computing servers 101 comprising a processor 112, a memory 111, and a communication interface 114 functions as a computing node of the parallel system 1. The parallel system 1 is provided with a plurality of the computing servers 101 in parallel and accomplishes high-speed computing by executing the program designated by the job as submitted with the plural computing servers 101 in parallel. The processor 112 is a general purpose computing device such as a CPU (Central Processing Unit), an MPU (Micro-processing Unit), and the like, and realizes a computing processing of the parallel system 1 by executing a parallel program executing program 131 stored in the memory 111 mentioned below. The memory 111 is configured with a memory device such as a ROM (Read Only Memory), a RAM (Random Access Memory) with an I/O performance satisfying a processing performance of the processor 112. The memory 111 stores a parallel program executing program 131 realizing a parallel processing of a program in the parallel system 1. Additionally, the memory 111 stores a program to be executed in parallel and data to be used by the program. The memory 111 also stores an input/output program executing input/output processing of data about the memory 111.

The parallel program executing program 131 is configured to enable cooperation of the plurality of the computing servers 101 for parallel processing of a program in accordance with the MPI (Message Passing Interface) standard. The parallel program executing program 131 can be installed in an appropriate manner according to the required specification of the parallel system 1 to which the program 131 is applied.

The communication interface 114 comprises an interface circuit with the communication network 104 coupling between the I/O management server 102A, the I/O servers 102B and the computing servers 101 and a driver therefor. When the communication network 104 is a storage area network (SAN) according to the Fibre Channel (FC) protocol, the communication interface 114 is an FC interface.

As shown in FIG. 1, some of the computing servers 101 are coupled with a computing acceleration module 105. The computing acceleration module 105 is a computing device provided to enable higher-speed processing of some processes of an application program normally executed with the general purpose processor 112. As the computing acceleration module 105, a GPU can be used for example, which is specialized in executing graphic processing. In an option, the computing acceleration module 105 may be configured with a vector-type computing device for the processor 112 of a scholar-type. Though, in the example of FIG. 1, the computing server 101 utilizing the computing acceleration module 105 is coupled to the computing acceleration module 105 through an appropriate communication line via the communication interface 113, the computing acceleration module 105 may be provided integrally in the computing server 101.

As mentioned above, as the communication network 104, an appropriate network satisfying the required specification of the parallel system 1 such as SAN according to the FC protocol may be employed.

The I/O management server 102A and the I/O server 102B are computers with a function of managing input/output of data stored in the storage apparatus 106 to be described below and executing a data input/output processing for the storage apparatus 106 in response to data I/O requests from the computing server 101. The configuration of the I/O management server 102A is different from that of the I/O server 102B in that the data stored in the storage apparatus 106 managed by the I/O management server 102A is metadata about the data stored in the storage apparatus 106 managed by the other I/O servers 102B.

The I/O management server 102A and the I/O server 102B, sharing substantially an identical configuration as hardware, each comprises a processor 122, a memory 121, and communication interfaces 123, 124. The processor 122 is a general purpose computing device such as a CPU, an MPU, and the like, and realizes a data input/output processing of the parallel system 1 by executing a parallel program executing program 141 stored in the memory 121 to be described below. The memory 121 is configured with a memory device such as a ROM, a RAM with an I/O performance satisfying a processing performance of the processor 122 and stores a parallel program executing program 141. Additionally, to be described below, the memory 121 stores a program for realizing efficient data distribution in the parallel system 1 according to the present embodiment and various data to be used by the program. The memory 121 also stores a program and tables for modifications of the present embodiment, to be described below with reference to the description of the modifications.

The memory 121 also stores a file system program 144 that is software for management of data files stored in a plurality of the storage apparatuses 106. As the file system program 144, a distributed file system such as a network file system (NFS) may be employed. With respect to data files stored in a plurality of the storage apparatuses 106 in a distributed manner, data security in the case of hardware trouble must be considered. In this respect, the plurality of the storage apparatuses 106 are constructed as a redundant configuration employing an appropriate RAID (Redundant Alley of Independent Disks) configuration. When RAID5 is employed, for example, one data file is stored in 4 storage drives under striping into 3 data pieces and one parity, i.e., (3D+P).

The communication interface 123 comprises an interface circuit with the communication network 104 coupling between the I/O management server 102A, the I/O server 102B and the computing servers 101 and a driver therefor. When the communication network 104 is a storage area network (SAN) according to the Fibre Channel (FC) protocol, the communication interface 123 is an FC interface. The communication interface 124 comprises an interface circuit with the communication line coupling between the I/O management server 102A, the I/O server 102B and the storage apparatus 106 and a driver therefor. When the communication line employs the FC protocol, the communication interface 124 is an FC interface.

As a configuration for realizing efficient data distribution in the present embodiment, the memory 121 of the I/O management server 102A stores an executing program type acquiring program 142, an I/O bandwidth control policy determination program 143, and a host definition information table 151, a rank arrangement information table 152, an acceleration module location information table 153, an application program characteristics information table 154, and a running program information table 155, each storing data to be used by the above programs. The above programs and the tables will be described below.

The memory 121 of the I/O server 102B stores a parallel program execution program 161 that is identical to that of the I/O management server 102A and a file system program 163. The memory 121 also stores an I/O bandwidth control program 162 executing a bandwidth control processing in relation to each I/O server 102B according to the bandwidth control policy determined by the I/O management server 102A.

As described above, the storage apparatus 106 is a storage device for storing data to be used by the computing server 101, and comprises a storage drive such as a hard disk drive (HDD), a solid state drive (SSD), and the like. The storage apparatus 106 coupled with the I/O management server 102A stores metadata 171 with respect to data 172 stored in the storage apparatuses 106 coupled to the I/O server 102B. As mentioned above, the plurality of the storage apparatuses 106 are configured as a RAID configuration from the view point of data security.

The user terminal 103 is a terminal apparatus for allowing a user using the parallel system 1 to input a job designating a program to be executed by the parallel system 1 and to receive a computing result of the parallel system 1. The user terminal 103 comprises a processor 1031 such as a CPU, a MPU, and the like, a memory 1032 such as a RAM, a ROM, and the like, and a communication interface 1033. In the example shown in FIG. 1, the user terminal 103 is coupled with the I/O management server 102A, however, the present embodiment is not to be limited to the above configuration.

The memory 1032 of the user terminal 103 stores a terminal program 1034. The terminal program 1034 has such functions as accepting a job input from a user through an I/O device such as a keyboard, a display monitor, and the like that are not shown, transferring the input job to the I/O management server 102A, and receiving a computing result of the parallel system 1 to output the same. The I/O device may be provided to the computing server 101, the I/O management server 102A, and the I/O server 102B as the user terminal 103.

Figure 2:
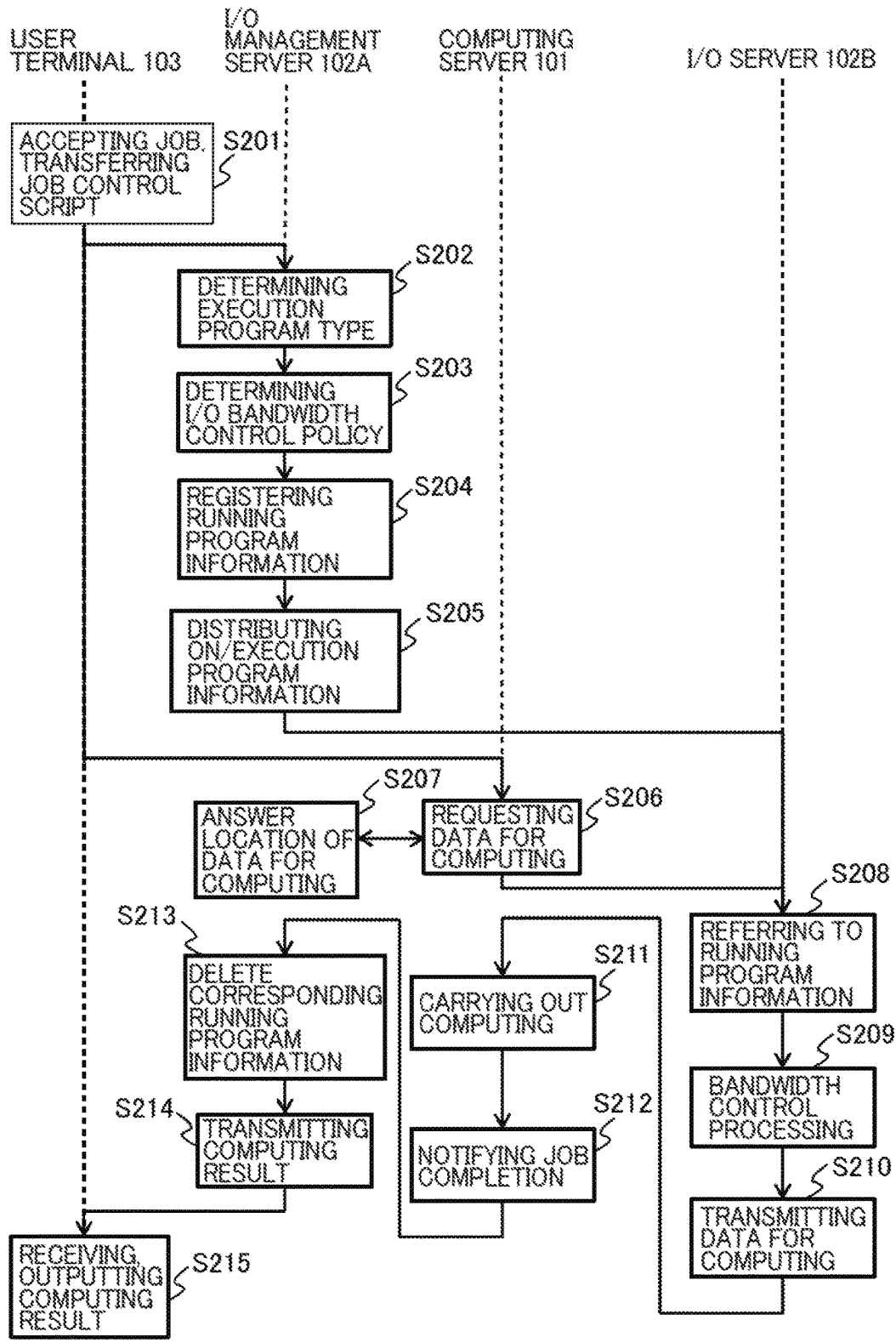
FIG. 2 is a sequence diagram showing data processing operation by the parallel system 1.

Next, a summary of the data processing on executing the submitted job in the parallel system 1 with the configuration as described above will be given. FIG. 2 is a sequence diagram showing a summary of a data processing flow in the parallel system 1. As assumption is made that the parallel system 1 has been activated, when the user terminal 103 receives a job to be executed, the user terminal 103 transfers a job control script to the I/O management server 102A (S201). The job control script is also transferred to each of the computing servers 101 from the user terminal 103. In FIG. 2, for simplicity, one computing server 101 and one I/O server 102B are shown. As a feature of the configuration of the present embodiment, first, the I/O management server 102A executes an executing program type determination processing and identifies a program to be executed according to the submitted job (S202). The I/O management server 102A determines the I/O bandwidth control policy in accordance with the type of the application to be executed (S203), registers the information in the running program information table (S204), and distributes the updated running program information table to the I/O server 102B (S205).

On the other hand, the job accepted by the user terminal 103 is also transferred to each of the computing servers 101. Each of the computing server 101 activates the application program designated by the job according to an instruction of the parallel program executing program 131, inquires the location of data for computing to be used by the application program to the I/O management server 102A, and acquires an answer to the inquiry (S206, S207). The computing server 101 requests the corresponding I/O server 102B for the data for computing based on the answer from the I/O management server 102A (S206).

The I/O server 102B having received the request for the data for computing from the computing server 101 refers to the running program information table held therein (S208), executes a bandwidth control processing on the output of the requested data based on the table (S209), and transmits the data for computing to the computing server 101 as a requester (S210).

The computing server 101 having received the data for computing from the I/O server 102B executes a computing processing according to the running application program using the data for computing (S211), and, if the parallel program executing program determines that the execution of the application program defined in the running job has been completed, transmits a job completion notification including the computing result to the I/O management server 102A (S212).

The I/O management server 102A having received the job completion notification from the computing server 101 deletes the information of the program corresponding to the completed job from the running program information table (S213), and transmits the computing result to the user terminal 103 (S214). The user terminal 103 outputs the computing result received from the I/O management server 102A and completes execution of the accepted job (S215). As described above, the parallel system 1 of the present embodiment enables execution of bandwidth control in the data I/O processing of the I/O server 102B according to the application program to be executed with the designation by the job and efficient data distribution to the computing server 101. Hereinbelow, a step-by-step description will be given on detailed configuration enabling operation of the parallel system 1 as described above.

First, the tables stored in the I/O management server 102A will be described. FIG. 3 shows a configuration example of the host definition information table 151. The host definition information table 151 showing the number of processes that each computing server 101 as a computing node is able to execute in parallel, records a computing server name 301 as an identifier for identifying each computing server 101 and the quantity 302 of the CPU provided to the computing server 101 identified with the corresponding computing server name 301. In the example of FIG. 3, the identifying codes such as "HOST1", "HOST2" are given to the computing servers 101. The host definition information table 151 is prepared by the system administrator on constructing the parallel system 1.

FIG. 4 shows a configuration example of a rank arrangement information table 152 (process arrangement information). Here, "rank" is a code provided to each process to be executed in the parallel program execution program such as an MPI for enabling identification of the process to each other. The allotted rank is usually a serial number. The rank allotted to each of the processes in the program defines which computing server 101 will execute the process concerned. The rank arrangement information table 152 is created for each of the programs executed in the parallel system 1, in which a rank number 301 allotted to the process and a computing server name 302 of the computing server executing the corresponding process are recorded in a correlated manner. According to the rank arrangement information table 152, it is known that each of the processes is executed by which computing server 101.

FIG. 5 shows a configuration example of the acceleration module location information table 153. The acceleration module location information table 153 records therein a computing server name 501 correlated with presence/absence 502 of the computing acceleration module. The acceleration module location information table 153 shows which computing server 101 in the parallel system 1 is provided with the computing acceleration module 105.

FIG. 6 shows a configuration example of the application program characteristics information table 154. The application program characteristics information table 154 stores the information in terms of the processing performance of the computing server 101 required by the application program executed in the parallel system 1. The application program characteristics information table 154 records an application program name 601, presence/absence 602 of using the computing acceleration module, and a required data precision 603 in a mutually correlated manner. The example of FIG. 6 shows that the program specified by the program name 601 of "AP1" is executed by the computing server 101 without the computing acceleration module requiring 64-bit double-precision floating-point arithmetic as the data precision 603.

FIG. 7 shows a configuration example of the running program information table 155. The running program information table 155 is prepared in the I/O management server 102A beforehand on constructing of the parallel system 1. In the running program information table 155, for every submission of a job into the system 1, the information of the application program relating to the job is registered by the I/O bandwidth control policy determination program to be described below. In the example of FIG. 7, in the running program information table 155, a computing server name 701, a program name 702, a number of processes 703, presence/absence of the computing acceleration module 704, and an I/O priority 705 are recorded in a mutually correlated manner. Each record of the running program information table 155 shows the program name 702 of the program executed by the computing server 101 specified by the computing server name 701, the number of the processes allotted to the program, whether the computing acceleration module is used, and the I/O priority of the executed program.

Figure 8:
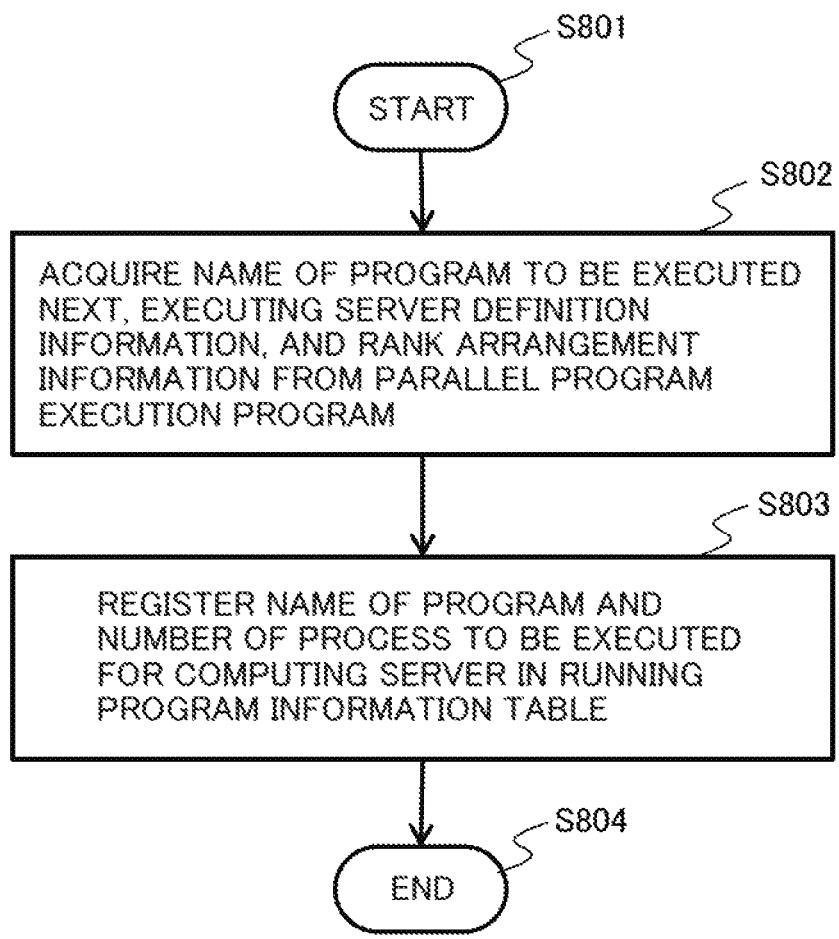
FIG. 8 shows an exemplary processing flow of a running program type retrieval processing.

Next, the processing flow of the data distribution processing in the parallel system 1 of the present embodiment will be described according to the specific example of the processing flow. FIG. 8 shows an example of the processing flow of the executing program type acquiring program 142 of the I/O management server 102A. This exemplary processing flow corresponds to the step, S202 in the overall flow example in FIG. 2. The executing program type acquiring program 142 starts the processing when the parallel program execution program 141 has received the job submitted by the user terminal 103 (S801), acquires the application program name of the application to be executed in terms of the job based on the information acquired from the submitted job by the parallel program execution program 141, and acquires the computing server 101 to be in charge of the processing, the number of the processes to be executed by the computing server 101, and the presence/absence of use of the acceleration module with referring to the host definition information table 151, the rank arrangement information table 152, and the acceleration module location information table 153 (S802). Then, the executing program type acquiring program 142 registers the program name of the program to be executed, the name of the computing server in charge, the number of the processes, and presence/absence of use of the acceleration module in the running program information table 155, and terminates the processing (S803, S804).

Figure 9:
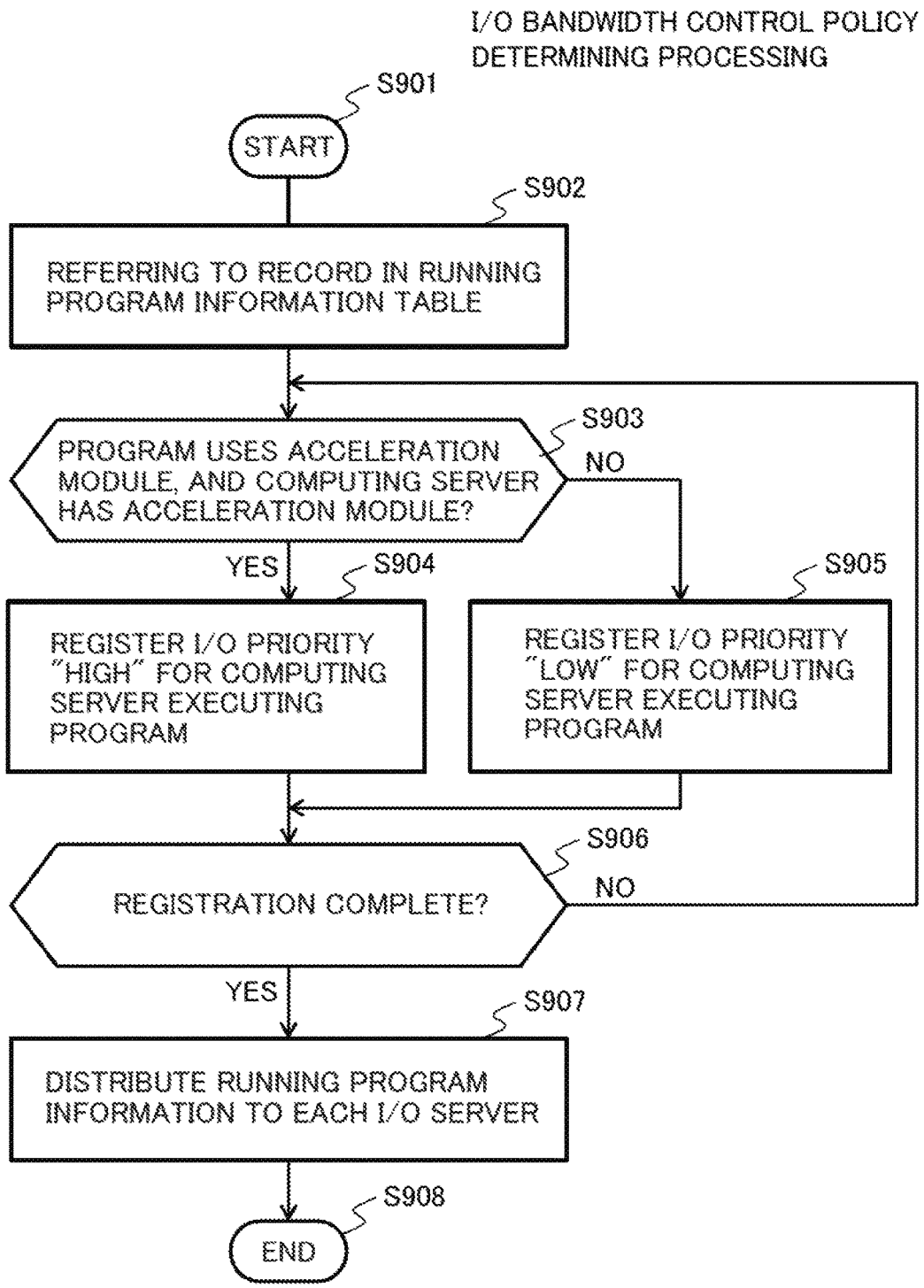
FIG. 9 shows an exemplary processing flow of an I/O bandwidth control policy determination processing.

Next, the data processing of the I/O bandwidth control policy determination program 143 will be described referring to the exemplary processing flow in FIG. 9. The I/O bandwidth control policy determination program 143 starts the processing at the step of S901, refers to the record registered by the running program type acquiring program 142 in the running program information table 155 (S902), and checks whether the application program registered in the running program information uses the computing acceleration module, and whether the computing server 101 processing the application program concerned has the computing acceleration module 105 (S903). If it is determined that the application program concerned uses the computing acceleration module and the computing server 101 processing the application program concerned has the computing acceleration module 105 (S903, Yes), the I/O bandwidth control policy determination program 143 records "HIGH" for the I/O priority 705 in the running program information table 155 in terms of the computing server 101 executing the application program concerned and proceeds to the processing at the step of S906 (S904). On the other hand, if it is determined that the application program concerned does not use the computing acceleration module or the computing server 101 processing the application program concerned does not have the computing acceleration module 105 (S903, No), the I/O bandwidth control policy determination program 143 records "LOW" for the I/O priority 705 in the running program information table 155 in terms of the computing server 101 executing the application program concerned and proceeds to the processing at the step of S806 (S905).

At the step of S906, the I/O bandwidth control policy determination program 142 determines if the registration of all the application programs in the job submitted in the parallel system 1 in the running program information table 155 is completed, and, if determined that the registration is not completed, returns to the processing at S903. If it is determined that the registration is completed (S906, Yes), the I/O bandwidth control policy determination program 142 transmits the updated running program information table 155 to each of the I/O servers 102B and terminates the processing (S907, S908).

As described above, each of the I/O server 102B is enabled to control the I/O bandwidth according to the application program executed by the computing server 101 as a data requester with utilizing the running program information table 155 distributed to each I/O server 102B.

Next, as a modification of the embodiment as described above, a configuration for controlling the I/O bandwidth more precisely than simple switching between high/low levels of the I/O priority. With respect to the application program to be executed, the exemplary modification is configured to take a size of the problem to be processed and the computing performance required for each process into consideration in addition to the presence/absence of using the computing acceleration module. FIG. 10 shows a configuration example of the I/O volume hint information table 156 providing information for realizing the I/O bandwidth control in the exemplary modification. The I/O volume hint information table 156 in FIG. 10 is configured to provide a certain index for an I/O bandwidth of the I/O server 102B on whether the problem to be processed by the application program concerned is large or small, in other words, whether the data volume to be used in execution of the application program is large or small, for the application program to be executed in the parallel system 1. The I/O volume hint information table 156 is generated on construction of the parallel system 1 and may be stored in the memory 121 of the I/O management server 102A.

In the example of FIG. 10, each record in the I/O volume hint information table 156 records a program name 1001, a process type 1002, a problem size 1003, and a computing performance per unit processing 1004 in mutually correlated manner. For the program name 1001 of the application program to be executed, the process type 1002 records whether the program is processed by an ordinary general purpose processor or a computing acceleration module, the problem size 1003 records an index of large/middle/small indicating a data volume given to the program concerned, and the computing performance per unit processing 1004 records the computing performance to be supplied for each problem size as a floating-point operations per second or FLOPS per process.

FIGS. 11A, 11B show configuration examples of job control scripts in the present exemplary modification. In the job control script illustrated as an example in FIG. 11A, the description, #JCS-unit designates computing using 50 computing servers with defining 4 jobs for the computing acceleration modules as one unit. In this case, the total number of the processes to be executed amounts to 200 produced by multiplying 50 by 4. Accordingly, in an MPI job execution command "mpiexec," the execution process number is set to "200." Meanwhile, "Middle" described in "#JCS-psize" means designation of a middle-sized problem, for example. The job control script in FIG. 11A is executed by the "jcssubmmit" command described in the job scheduler "JCS" in FIG. 11B. The execution of the above command triggers execution of the processing flow in FIG. 12.

Figure 12:
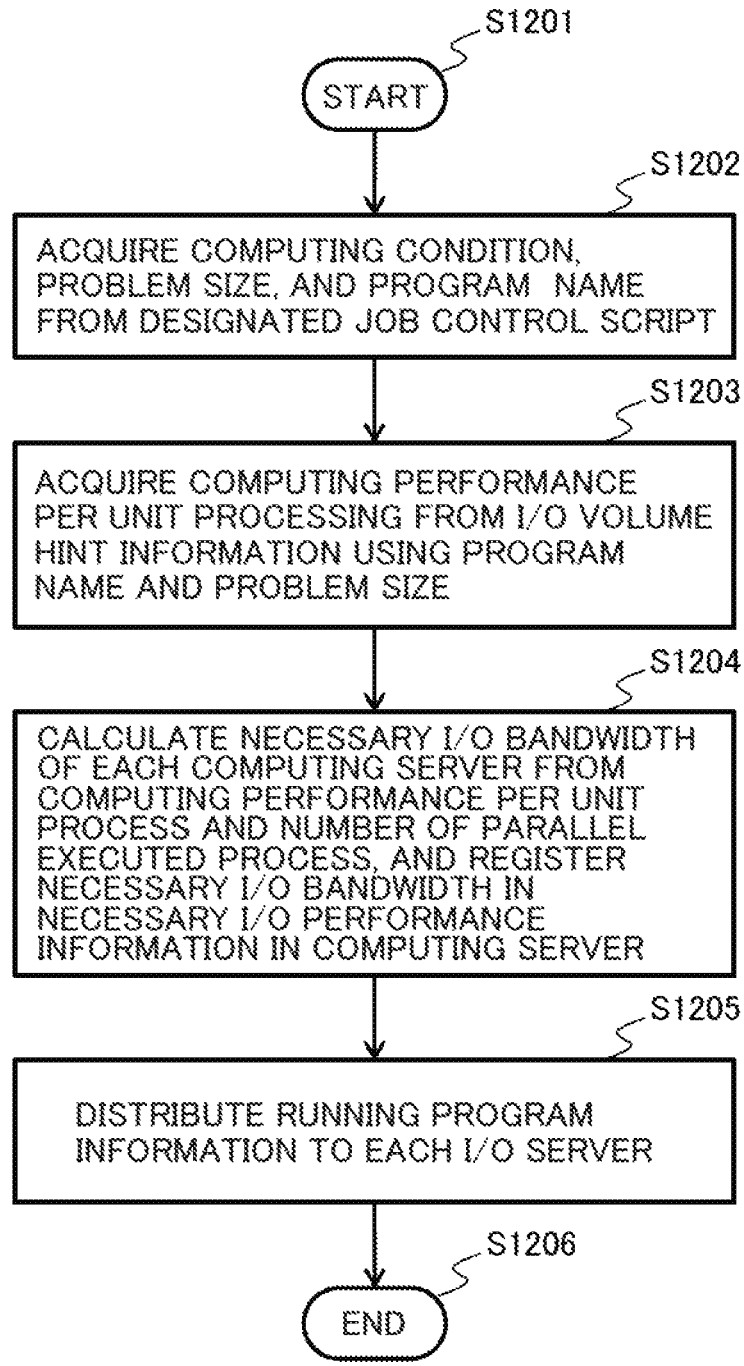
FIG. 12 shows an exemplary processing flow of an I/O bandwidth allocation determination processing.

FIG. 12 shows an exemplary processing flow of the I/O bandwidth allocation determination processing to be executed instead of the I/O bandwidth control policy determination processing in S203 of FIG. 2 in the embodiment described above. The I/O bandwidth allocation determination program 145 stored in the memory 121 of the I/O management server 102A starts the processing when the job is submitted (S1201) and acquires the computing condition, the problem size, and the name of the program to be executed from the designated job control script (S1202). Then, the I/O bandwidth allocation determination program 145 acquires the computing performance per unit processing 1004 from the I/O volume hint information table 156 based on the acquired program name and the problem size (S1204). Further, The I/O bandwidth allocation determination program 145 calculates the required I/O bandwidth for each of the computing servers 101 from the computing performance per unit processing 1004 and the number of the processes executed in parallel, and registers the required I/O performance information of each computing server 101 (S1204). The I/O bandwidth allocation determination program 145 distributes the updated running program information table to each of the I/O servers 102B and terminated the processing (S1205, S1206).

FIG. 13 shows a configuration example of the required I/O performance information table 157 of the computing server 101. The required I/O performance information table 157 is prepared in the memory 121 of the I/O management server 102A. The required I/O performance information table 157 records the computing server name 1301 and the required I/O performance for the computing server 101 concerned in a mutually correlated manner. As described with respect to the step of S1204 in FIG. 12, the required I/O performance 1302 for the computing server 101 can be calculated by acquiring the computing performance per unit processing 1004 from the program name 1001, the process type 1002 indicating presence/absence of usage of the computing acceleration module, and the problem size 1003 acquired from the job control script exemplified in FIG. 11A, for example, and multiplying the above computing performance 1004 by the number of the processes and the required data precision in the running program information table 155. For example, in the example of FIG. 13, with respect to the computing server "HOST1", the process number of "2" for the program "AP2" is obtained from the running program information table 155 and the computing performance per unit processing of 40 MFLOPS is obtained for the problem size of "MIDDLE" in the running program information table 155. Meanwhile, referring to the application characteristics information table 154, the data precision 603 is a single precision for the program "AP2." Accordingly, as shown in FIG. 13, for example, the product of 2 processes, 40 MFLOPS and the single precision of 320 MB/s is required to be allotted to the computing server "HOST1."

FIG. 14 shows a configuration example of the required I/O performance/priority definition table 158. The required I/O performance/priority definition table 158 is prepared in the memory 121 of the I/O management server 102A. The required I/O performance/priority definition table 158 records an I/O priority 1402 corresponding to the required I/O performance 1401 of the computing server 101 obtained in FIG. 13. Therefore, the I/O bandwidth allocation determination program 145, with referring to the required I/O performance/priority definition table 158, is able to record an appropriate I/O priority 1402 in the running program information table 155. According to the above, each of the I/O servers 102B having received the corresponding running program information table 155 is enabled to apply the I/O priority 1402 defined in FIG. 14 for the data I/O request received from the computing server 101. It is to be noted that, in the present exemplary modification, the I/O priority is classified into 3 levels according to the required I/O performance, however, the I/O priority may be classified into more levels.

Figure 15:
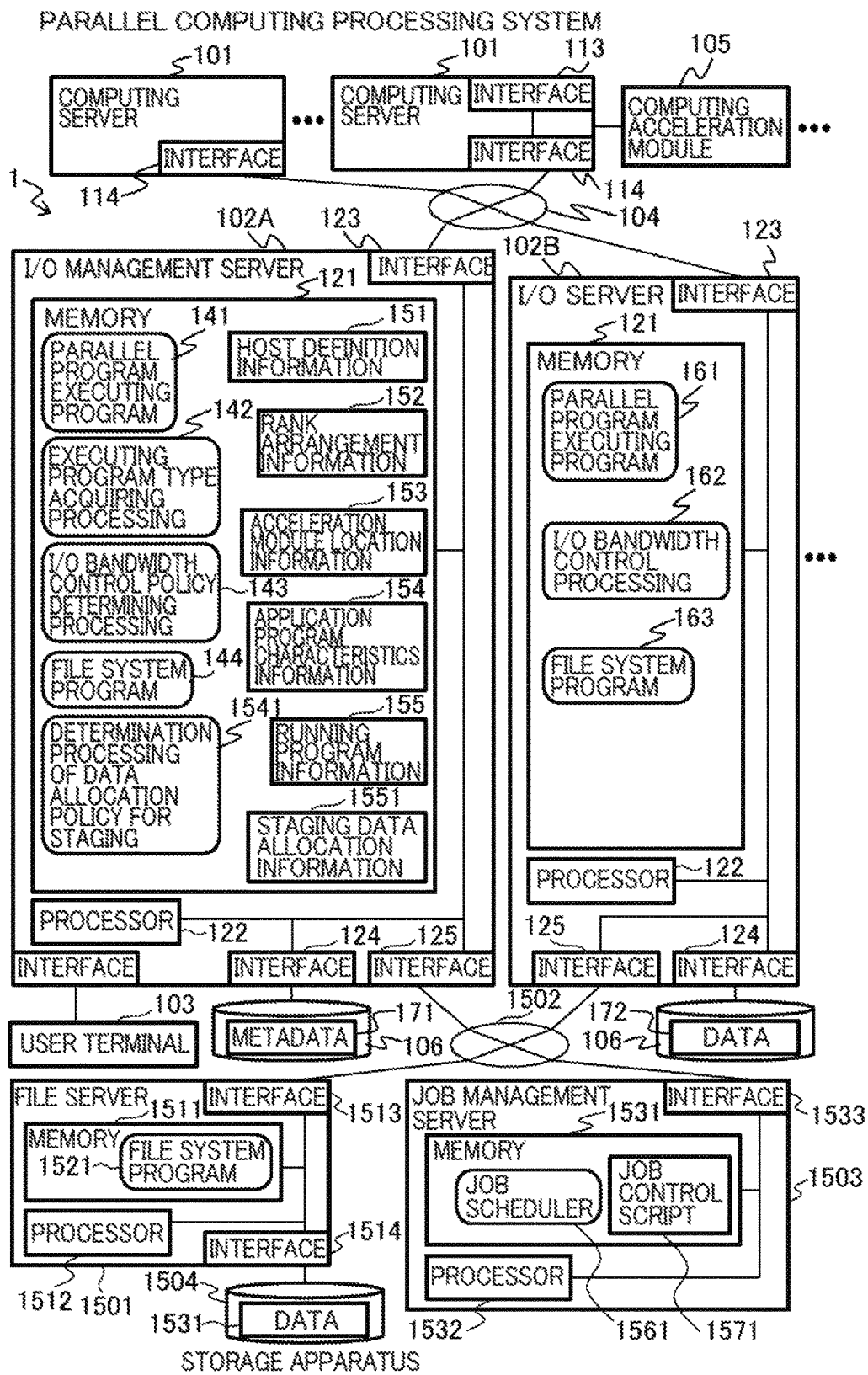
FIG. 15 shows an entire configuration example of a parallel system 1 according to another embodiment of the present invention.

Next, the parallel system 1 to which the data distribution apparatus according to another embodiment of the present invention will be described. FIG. 15 shows an entire configuration example of the present parallel system 1. The parallel system 1 exemplified in FIG. 15 is different from the parallel system 1 in FIG. 1 with respect to the I/O management server 102A and the I/O server 102B, in that a file server 1501 or a secondary storage apparatus is coupled to a job management server 1503 via a communication network 1502. According to this difference, the I/O management server 102A is provided with a staging data arrangement information table 1551 and a staging data arrangement policy determination program 1541. In the parallel system 1 in FIG. 15, the data to be used for executing the program in the computing server 101 are additionally stored in the storage apparatus 1504 managed by the file server 1501. Therefore, in the present parallel system 1, the I/O management server 102A analyzes the job submitted by the user terminal 103 and the staging processing as a processing of reading the data managed by the file server 1501 into the storage apparatus 106 acting as a working disk for the computing server 101 is carried out.

The file server 1501 comprises a processor 1512 such as a CPU and an MPU, a memory 1511 such as a RAM and a ROM, and communication interfaces 1513, 1514. A file system program 1521 such as an NFS is stored in the memory 1511. The communication interface 1513 comprises an interface circuit as an interface with the communication network 1502 and a driver therefor. The communication interface 1514 comprises an interface circuit as an interface with the communication line with the storage apparatus 1503 such as a SAN with an FC protocol and a driver therefor.

The storage apparatus 1504 comprises a storage device such as an HDD and an SSD and employs a RAID configuration constructed with a plurality of storage drives from the point of view of data security. The parallel system 1 of the present embodiment is configured to execute the I/O bandwidth control according to the level of striping for the data distributedly stored in among the plurality of the storage drives.

The execution of the job submitted from the user terminal 103 is controlled by the job management server 1503. The job management server 1503 comprises a processor 1532 such as a CPU and an MPU, a memory 1531 such as a RAM and a ROM, and a communication interface 1533. A job scheduler program 1561 is stored in the memory 1531. The job control script 1571 to be used by the job scheduler 1561 for a job execution control from the user terminal 103 is additionally stored in the memory 1531. The communication interface 1502 comprises an interface circuit with the communication network 1502 and a driver therefor.

FIG. 16 shows a configuration example of the job control script 1571. Assumption is made with respect to FIG. 16 such that, like the job control script exemplified in FIG. 11A, the program specified by the program name "AP1" is processed in parallel with 1000 processes with the MPI. See the "mpiexec" command with the code 1304. With the "stagein" statement of the codes 1301, 1302, the data in the directory specified by input.dat are subject to a stage-in processing before execution of AP1. "%opt:" means an optional processing specifying data arrangement for staging in the present embodiment. Code 1303 is designation for staging-out the data after completion of execution of the program AP1. "./output:" means an output destination directory for an execution result of AP1.

Figure 17:
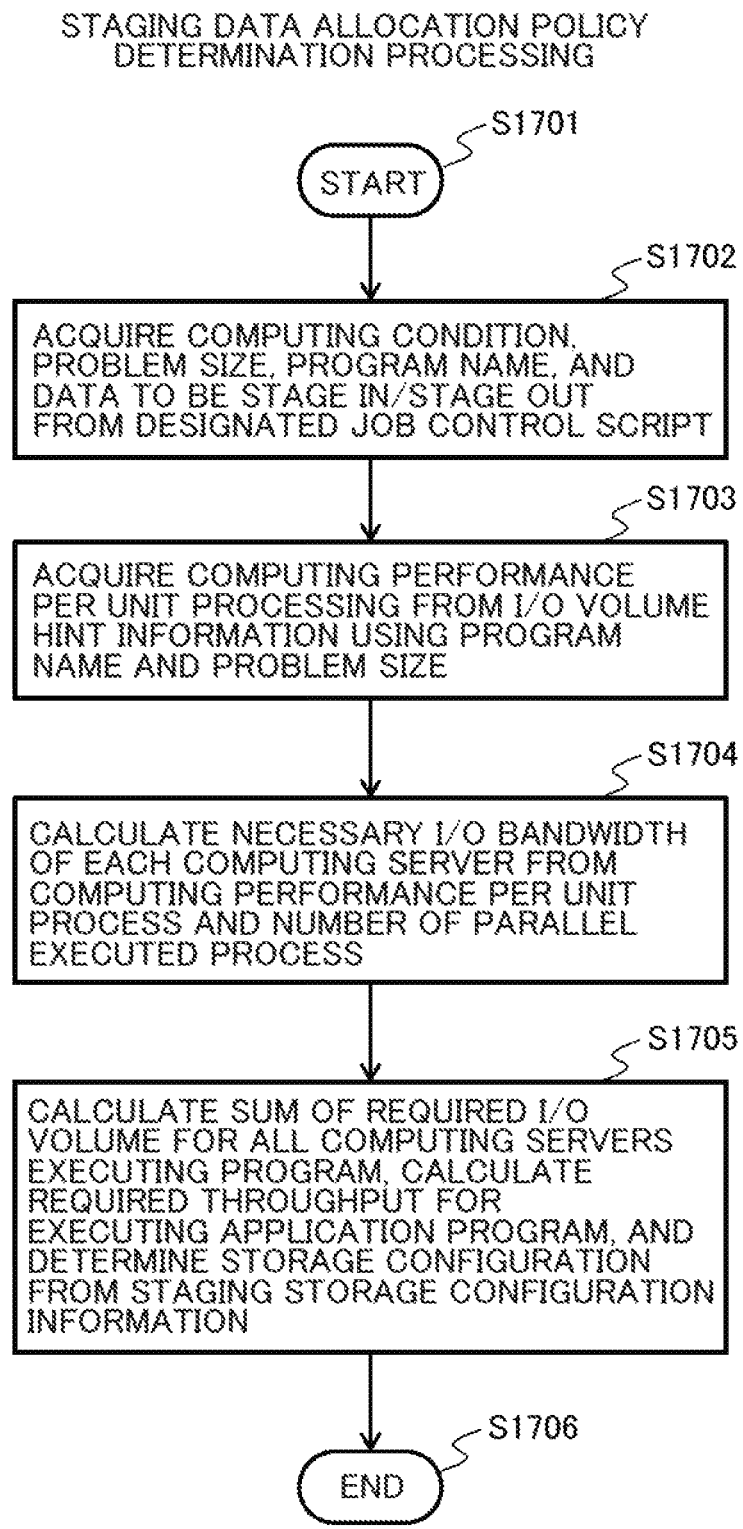
FIG. 17 shows an exemplary processing flow of a staging data arrangement policy determination processing.

FIG. 17 shows an exemplary processing flow of the staging data arrangement policy determination processing performed by the staging data arrangement policy determination program 1541 in the I/O management server 102A according to the job control script 1571. The staging data arrangement policy determination program 1541 starts processing according to the job control script 1571 (S1701), and acquires the computing condition, the problem size, and the data for staging-in/staging-out from the designated job control script 1571 (S1702). Then, the staging data arrangement policy determination program 1541 acquires the computing performance per unit processing 1004 from the I/O volume hint information table 156 based on the acquired program name and the problem size (S1703). Further, the staging data arrangement policy determination program 1541 calculates the required I/O performance for each computing server 101 from the computing performance per unit processing 1004 and the number of processes executed in parallel, i.e., the process number 703 in the running program information table 155, and registers the calculated computing performance in the required I/O performance information table 157 of the computing server 101 (S1704). Lastly, the staging data arrangement policy determination program 1541 calculates the sum of the required I/O volume for all the computing servers 101 executing the program, calculates the required throughput for execution of the application program concerned, determines the storage configuration from the storage configuration information for staging, and terminates the processing (S1705, S1706).

FIG. 18 shows a configuration example of the staging data arrangement information table 1551 with respect to the required I/O performance for the computing server 101. The staging data arrangement information table 1551 stores a throughput 1801 required for the computing server 101, a configuration of a data striping to be a configuration of the file system 1521 of the file server 1501 in a mutually correlated manner. Accordingly, the data striping configuration suitable to the required I/O performance for the computing server 101 is made applicable to the file system 1521.

As described above, according to the embodiment of the present invention, efficient data distribution to a number of computing nodes in the parallel system from the storage according to the program to be executed is made possible.

It is to be noted that the present invention is not limited to the above embodiments, but includes various modifications. For example, the above embodiments are described in detail for facilitating understanding of the present invention, and the present invention may not be limited to those comprising all the elements as described above. Meanwhile, the configuration of the embodiments may be partially replaced with another configuration, and a configuration of an embodiment may be provided with another configuration.

REFERENCE SIGNS LIST

1 Parallel computing processing system
101 Computing server
102A I/O management server
102B I/O server
103 User terminal
105 Computing acceleration module
106, 1504 Storage apparatus
131, 141, 161 Parallel program executing program
142 Executing program type acquiring program
143 I/O bandwidth control policy determination program
144, 163 File system program
151 Host definition information table
152 Rank arrangement information table
153 Acceleration module location information table
154 Application program characteristics information table
155 Running program information table
162 I/O bandwidth control program
1501 File server
1503 Job management server
1541 Staging data arrangement policy determination program
1551 Staging data arrangement information table
1561 Job scheduler
1571 Job control script

The invention claimed is:

1. A data distribution apparatus in a parallel computing processing system executing parallel processing of an application by a plurality of computing nodes, each node being configured as a computing server comprising a processor and a memory, the data distribution apparatus comprising a processor and configured to distribute data to be used by the application to the respective computing nodes, in the parallel computing processing system, wherein one or more of the computing servers are provided with a computing acceleration module carrying out a higher-speed computing processing according to designation by the application concerned when a specific one of the applications is executed, and data to be used by the application are stored in a plurality of storage apparatuses in a distributed manner, the processor of the data distribution apparatus configured to:

hold computing acceleration module location information indicating which of the computing servers has the computing acceleration module and application characteristics information indicating which of the applications uses the computing acceleration module, receive a job designating which of the applications to be executed, and refer to the application characteristics information with respect to the application to be executed designated in the job and the computing acceleration module location information with respect to the computing server which executes the application designated in the job, determine whether the application uses the computing acceleration module in the computing server, generate input/output processing priority information that prioritizes the input/output processing with respect to a data input/output request received from the computing server which executes the application using the computing acceleration module, distribute the input/output processing priority information to the respective storage apparatuses, and enable the respective storage apparatuses to control a preferential input/output bandwidth for the computing server which executes the application designated in the job using the computing acceleration module based on the input/output processing priority information.

2. The data distribution apparatus in the parallel computing processing system according to claim 1, wherein the processor of the data distribution apparatus holds, for each of the processes constituting the application, process management information relating to which of the computing servers to be used, the processor of the data distribution apparatus determines, for each of the processes, whether the computing server having the computing acceleration module is used, the processor of the data distribution apparatus generates input/output processing priority information in which an input/output priority is prioritized with respect to a data input/output request received from the computing server for the process and distributes input/output processing priority information to the respective storage apparatuses, and the processor of the data distribution apparatus enables the respective storage apparatuses to perform an input/output bandwidth control based on the input/output processing priority information.

3. The data distribution apparatus in the parallel computing processing system according to claim 2, wherein the processor of the data distribution apparatus holds, for each of the processes of the application, I/O volume information for correlating a processing performance required for the computing server for a data volume to be processed in each of the processes, the processor of the data distribution apparatus calculates an input/output performance required for each of the processes by each of the computing server, and the processor of the data distribution apparatus generates the input/output processing priority information according to the input/output performance.

4. The data distribution apparatus in the parallel computing processing system according to claim 1, wherein the parallel computing processing system comprises a secondary storage apparatus coupled under the plurality of the storage apparatuses, and if the processor of the data distribution apparatus determines that the job submitted to the parallel computing processing system designates that the data stored in the secondary storage apparatus are read out into the plurality of the storage apparatuses before execution of the application, the processor of the data distribution apparatus splits the data into pieces of a number in accordance with the input/output performance required by the application and previously stores the pieces in the plurality of the storage apparatuses in a distributed manner.

5. A data distribution method in a parallel computing processing system for executing parallel processing of an application by a plurality of computing nodes, each node being configured as a computing server comprising a processor and a memory, for distributing data to be used by the application to the respective computing nodes, wherein one or more of the computing servers are provided with a computing acceleration module carrying out a higher-speed computing processing according to designation by the application concerned when a specific one of the applications is executed, and data to be used by the application are stored in a plurality of storage apparatuses in a distributed manner, the data distribution method comprising:

holding, by a computer having a processor and a memory, computing acceleration module location information indicating which of the computing servers has the computing acceleration module and application characteristics information indicating which of the applications uses the computing acceleration module;

receiving, by the computer, a job designating which of the applications to be executed; and referring, by the computer, to the application characteristics information with respect to the application to be executed designated in the job and the computing acceleration module location information with respect to the computing server which executes the application designated in the job, determining, by the computer, whether the application uses the computing acceleration module in the computing server, generating, by the computer, input/output processing priority information that prioritizes the input/output processing with respect to a data input/output request received from the computing server which executes the application using the computing acceleration module, distributing, by the computer, the input/output processing priority information to the respective storage apparatuses, and enabling, by the computer, the respective storage apparatuses to control a preferential input/output bandwidth for the computing server which executes the application designated in the job using the computing acceleration module based on the input/output processing priority information.

6. A non-transitory computer readable medium storing a data distribution program in a parallel computing processing system for executing parallel processing of an application by a plurality of computing nodes, each node being configured as a computing server comprising a processor and a memory, for distributing data to be used by the application to the respective computing nodes, wherein one or more of the computing servers are provided with a computing acceleration module carrying out a higher-speed computing processing according to designation by the application concerned when a specific one of the applications is executed, and data to be used by the application are stored in a plurality of storage apparatuses in a distributed manner, the data distribution program when executed by a computer having a processor and a memory, causing the computer to:

hold computing acceleration module location information indicating which of the computing servers has the computing acceleration module and application characteristics information indicating which of the applications uses the computing acceleration module;

receive a job designating which of the applications to be executed; and refer to the application characteristics information with respect to the application to be executed designated in the job and the computing acceleration module location information with respect to the computing server which executes the application designated in the job, determine whether the application uses the computing acceleration module in the computing server, generate input/output processing priority information that prioritizes the input/output processing with respect to a data input/output request received from computing server which executes the application using the computing acceleration module, distribute the input/output processing priority information to the respective storage apparatuses, and enable the respective storage apparatuses to control a preferential input/output bandwidth for the computing server which executes the application designated in the job using the computing acceleration module based on the input/output processing priority information.

* * * * *